(12) United States Patent
Dan et al.

(10) Patent No.: US 7,377,448 B2
(45) Date of Patent: May 27, 2008

(54) CARD DEVICE FOR CONNECTION TO A USB RECEPTACLE

(75) Inventors: Raz Dan, San Jose, CA (US); Itzhak Pomerantz, Kfar Saba (IL)

(73) Assignee: Sandisk IL Ltd, Kfar Saba ( * ) Notice: Subject to any disclaimer, the term of this patent is extended or adjusted under 35 U.S.C. 154(b) by 0 days.

(21) Appl. No.: 11/464,499

(22) Filed: Aug. 15, 2006

(65) Prior Publication Data

US 2006/0278723 A1    Dec. 14, 2006

Related U.S. Application Data

(63) Continuation-in-part of application No. 11/444,385, filed on Jun. 1, 2006, now Pat. No. 7,334,725.

(60) Provisional application No. 60/707,668, filed on Aug. 15, 2005, provisional application No. 60/686,013, filed on Jun. 1, 2005.

(51) Int. Cl.
*G06K 19/06* (2006.01)
(52) U.S. Cl. ...................................... 235/492; 235/380
(58) Field of Classification Search ............... 235/380, 235/492
See application file for complete search history.

(56) References Cited

U.S. PATENT DOCUMENTS

| | | | | |
|---|---|---|---|---|
| 6,883,718 | B1 * | 4/2005 | Le et al. | 235/492 |
| 6,890,188 | B1 * | 5/2005 | Le | 439/76.1 |
| 2006/0118639 | A1 * | 6/2006 | Kean et al. | 235/492 |
| 2006/0180674 | A1 * | 8/2006 | Margalit et al. | 235/492 |
| 2006/0219776 | A1 * | 10/2006 | Finn | 235/380 |
| 2006/0255158 | A1 * | 11/2006 | Margalit et al. | 235/492 |

FOREIGN PATENT DOCUMENTS

WO    WO2005/124932    12/2005

\* cited by examiner

*Primary Examiner*—Steven S. Paik
*Assistant Examiner*—Tuyen Kim Vo
(74) *Attorney, Agent, or Firm*—Mark M. Friedman (57) ABSTRACT

A card device has a generally rectangular body formed from flexible material and including electronic circuitry electrically connected to a set of electrical contacts. At least part of the card device is flexed, bent or folded in such a manner that the inherent resilience of the card material provides a force for pressing the set of contacts against the electrical contacts of a USB receptacle.

13 Claims, 8 Drawing Sheets

CARD DEVICE FOR CONNECTION TO A USB RECEPTACLE

This application is a continuation-in-part of application Ser. No. 11/444,385 filed Jun. 1, 2006, which itself benefited from the filing date of provisional application No. 60/686,013 filed Jun. 1, 2005. This application also benefits from the filing date of Provisional Patent Application No. 60/707,668 filed Aug. 15, 2005.

FIELD AND BACKGROUND OF THE INVENTION

The present invention relates to card-like devices and, in particular, it concerns a card device configured for connecting directly to a standard USB receptacle.

Flash memory drives and other devices based on similar technology are packaged in several forms and shapes, such as a key-holder, a pen, a pocketknife etc. One useful form factor for flash memory drive is that of a plastic card that can be carried in a credit card wallet, and may serve additional functions, such as for use as a smart card, a credit card or an identification card.

Due to the specifications of the USB standard, there is a narrow tolerance for the thickness of the connector plate of the USB plug, which has to be a minimum of about 1 mm. This thickness is almost twice as much as available in credit cards and smart cards, and in some cases, considerably more than twice the preferred thickness dimension of the card.

Known solutions for providing a USB connector on a thin card either require use of a thick card of thickness sufficient to reliably engage a USB socket, or employ a card formed as an assembly of at least two pieces in which one part moves relative to the other in order increase the thickness of the connector, when the card is to be used as a connector. Both solutions have the advantage of complying with the standard USB specifications, but have the disadvantage of making the card cumbersome and more expensive to produce.

PCT Patent Application Publication No. WO 2005/124932 to Atsmon et al. discloses (in FIG. 6b) a further approach according to which the thickness of the card is increased by doubling over the card on itself. The proposed approach does not seem to allow use of a conventional rectangular credit-card-type device, but rather requires a plug-width projecting element similar to the embodiments of Atsmon shown in FIGS. 8-11.

It is desired to have a card that has the shape and thickness of a standard credit card, carries a USB connector, and is most preferably made of one piece in a process of stamping and printing.

SUMMARY OF THE INVENTION

The present invention relates to a card made of a single part, preferably with the shape and thickness of a standard credit card, that contains a USB connector for connecting any digital device that is embedded in the card with a host device.

A preferred exemplary embodiment of the invention relates to a "USB Flash Disk" (or "UFD"), a well known non-volatile memory device, such as the DiskOnKey product available commercially from M-Systems (Kfar Saba, Israel). The UFD can typically be connected to a host device (computer, PDA, Cellular phone etc.) by a USB connector, designed according to the USB specifications available from http://www.usb.org/developers/docs. According to the teachings of the present invention, it is possible to package a UFD in a standard card, such as a credit card, an employee badge or a business card, with minimum disruption to the ordinary use of the card as a badge or as a smart card.

The main feature of the present invention is that the card maintains its substantially rectangular shape before, and preferably also after, being used as a UFD. The USB connector is located in a position that enables its insertion directly into a USB socket of the host device when the card is temporarily bent or folded.

The invention uses the elasticity of the material from which the body of the card is made, and utilizes its spring action to ensure proper contact of conducting pins of the connector to the corresponding pins in the USB socket.

One preferred embodiment of the present invention is described in a co-assigned unpublished U.S. patent application Ser. No. 11/444,385 of which this application is a continuation-in-part, and appears here as FIGS. 8A-8C.

Thus, according to the teachings of the present invention there is provided, a card device for connection to a USB receptacle, the card device comprising a substantially rectangular body formed from flexible material and including: (a) electronic circuitry; (b) a set of electrical contacts deployed on a surface of a first region of the body and electrically connected to the electronic circuitry; and (c) at least one preformed fold line passing adjacent to the first region and defining a line for folding a corresponding second region of the body relative to the first region of the body from a flat state to a folded state, wherein the set of electrical contacts and the at least one preformed fold line are configured such that, when the body is folded along the at least one preformed fold line, the first and second regions form a plug configuration sized for insertion into a USB receptacle with the electrical contacts positioned to contact electrical contacts of the USB receptacle, and such that a resilient bias of the second region to return to the flat state generates a contact force of the electrical contacts against contacts of the USB receptacle.

According to a further feature of the present invention, the substantially rectangular body further includes at least one cut passing adjacent to the first region and defining an edge of the plug configuration.

According to a further feature of the present invention, the preformed fold line extends substantially perpendicular to the cut.

According to a further feature of the present invention, the substantially rectangular body includes two parallel cuts on opposite sides of the first region and defining edges of the plug configuration.

According to a further feature of the present invention, the preformed fold line extends between, and substantially perpendicular to, the two parallel cuts.

According to a further feature of the present invention, the parallel cuts do not intersect a periphery of the substantially rectangular body.

According to a further feature of the present invention, the substantially rectangular body further includes a third cut such that the parallel cuts and the third cut together define a plug-forming region of the body inset from a periphery of the substantially rectangular body.

According to a further feature of the present invention, the plug configuration defines a direction of insertion, and wherein the at least one preformed fold line extends substantially perpendicular to the direction of insertion.

According to a further feature of the present invention, the plug configuration defines a direction of insertion, and wherein the at least one preformed fold line extends substantially parallel to the direction of insertion.

According to a further feature of the present invention, the at least one preformed fold line includes at least two preformed fold lines, the preformed fold lines defining edges of the plug configuration.

According to a further feature of the present invention, an entirety of the substantially rectangular body is folded along at least three substantially parallel fold lines to form the plug configuration.

According to a further feature of the present invention, the substantially rectangular body has a thickness less than half a minimum effective thickness required for mechanical engagement with the USB receptacle.

There is also provided according to the teachings of the present invention, a card device for connection to a USB receptacle, the card device comprising a substantially rectangular body formed from flexible material and including: (a) electronic circuitry; (b) a set of electrical contacts deployed on a surface of a first region of the body and electrically connected to the electronic circuitry; and (c) at least one flexion region, wherein the set of electrical contacts and the flexion region are configured such that, when the body is flexed at the at least one flexion region, the first region forms at least part of a plug configuration sized for insertion into a USB receptacle with the electrical contacts positioned to contact electrical contacts of the USB receptacle, and such that a resilient bias of the flexion region to return to a flat state generates a contact force of the electrical contacts against contacts of the USB receptacle.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is card device for connection to a USB receptacle.

The principles and operation of card devices according to the present invention may be better understood with reference to the drawings and the accompanying description.

By way of introduction, it should be noted that a common basis to all embodiments of the present invention is the provision of a card device having a substantially rectangular body formed from flexible material and including electronic circuitry electrically connected to a set of electrical contacts deployed on a surface of a first region of the body. The body is formed with a thickness no more than 0.9 mm, and preferably less than 0.5 mm, rendering its thickness insufficient for reliable engagement with a USB receptacle. According to the teachings of the present invention, at least part of the card device is flexed, bent or folded in such a manner that tie inherent resilience of the card material provides a force for pressing the set of contacts against the electrical contacts of the USB receptacle. In the embodiments of FIGS. 1A-7B, at least part of one or more fold in the card is inserted into an inner volume of the USB receptacle. In the embodiment of FIGS. 8A-8C, the flexing occurs entirely outside the volume of the USB receptacle.

Referring now in general terms to the embodiments of FIGS. 1A-7B, there is provided a card device for connection to a USB receptacle. In each case, the card device has a substantially rectangular body 10 formed from flexible material and including: electronic circuitry 12 electrically connected to a set of electrical contacts 14 deployed on a surface of a first region 16 of body 10. It is a particular feature of certain preferred embodiments of the present invention that body 10 further includes at least one preformed fold line 18 (FIGS. 1A-5B) or 42 and 44 (FIGS. 6A-7B) passing adjacent to first region 16 and defining a line for folding a corresponding second region of the body relative to the first region of the body from a flat state (FIGS. 1A, 2A, 3, 4A, 5A, 6A and 7A) to a folded state (FIGS. 1B, 2B, 4B, 5B, 6B and 7B). The configuration of the electrical contacts and the at least one preformed fold line, optionally in combination with various cut lines to be described below, is such that, when the body is folded along the at least one preformed fold line, the first and second regions of body 10 form a plug configuration sized for insertion into a USB receptacle with electrical contacts 14 positioned to contact electrical contacts of the USB receptacle, and such that a resilient bias of the second region(s) to return to the flat state of the device generates a contact force of the electrical contacts against contacts of the USB receptacle.

Before addressing the features of the invention in more detail, it will be helpful to define certain terminology as used herein in the description and claims. Firstly, reference is made to body 10 being "substantially rectangular". In this context, the phrase "substantially rectangular" is used to refer to any shape of which the majority is bounded by edges lying on a rectangle, and in which no plug portion or other element projects significantly beyond the boundary of the peripheral rectangle The phrase includes cases where the corners of the card are sharp or are rounded to various degrees, or where plural edges together forming a side of the rectangle are misaligned to an extent which does not interfere with the overall visual impression of a rectangular card.

Reference is made to a "flat" state of the card. The word "flat" is used in this context to refer to a configuration which is sufficiently flat to allow insertion into a credit card wallet or the like. It will be noted that the nature of flexible plastic materials from which the present invention is made is such that some degree of residual deformation may remain, particularly after repeated folding and unfolding of the card. Even in such cases, the unfolded state is referred to as a "flat" state.

Reference is made to electronic circuitry 12 contained in the card This electronic circuitry may be any electronic circuitry known for inclusion within a credit card, smart card, identity tag or USB peripheral device. Preferred examples include, but are not limited to, a flash memory chip. Similarly, the stored content of the chip may be any stored content suited to a particular intended application, as will be clear to one ordinarily skilled in the art.

It should be noted that the thickness of body 10 need not be uniform over the area of the card. In particular, for thin implementations, the thickness of an embedded chip, typically in the region of 0.09 mm, may cause a noticeable thickening of the corresponding region of the card. Where reference is made to a thickness of the card device, this should be taken as the thickness in the region of the electrical contacts, typically corresponding to the thickness of the majority of the card, and does not take into account any locally increased thickness in other regions of the card.

Figure 1A:
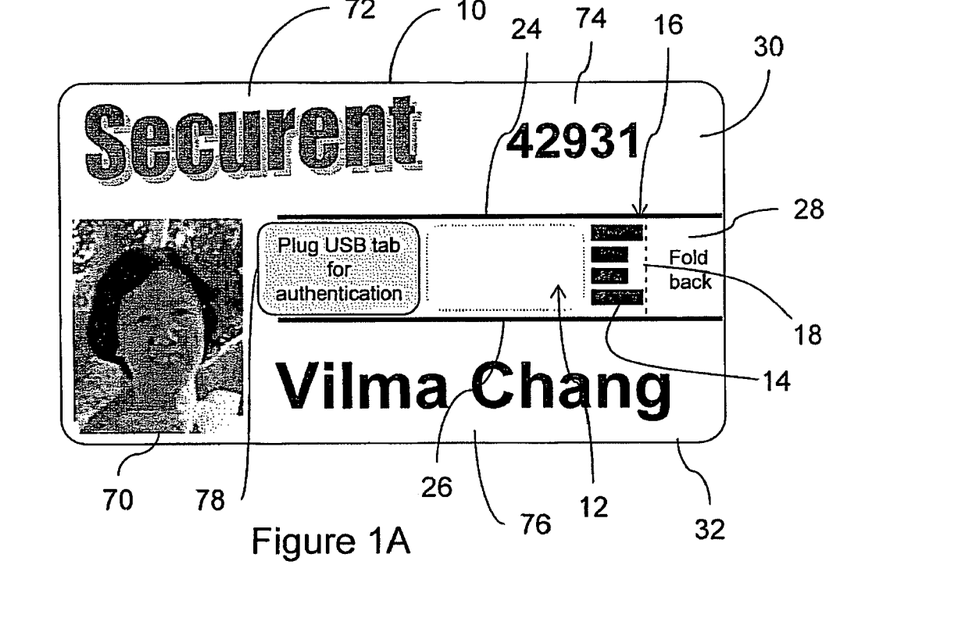
FIG. 1A is a front view of a first embodiment of a card device, constructed and operative according to the teachings of the present invention, for connection to a USB receptacle.
Figure 1B:
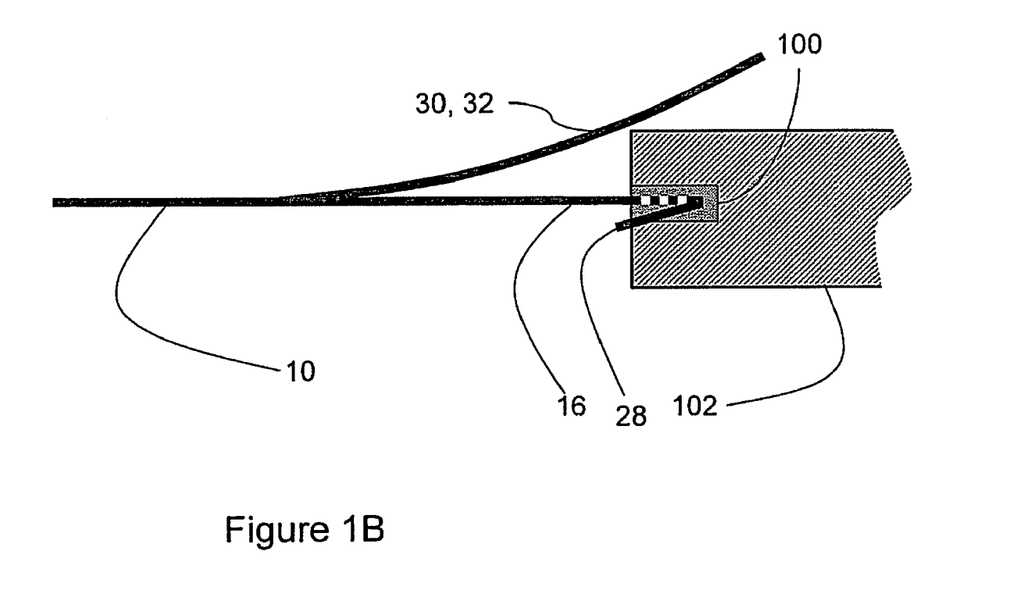
FIG. 1B is a side view of the card device of FIG. 1A connected to a USB receptacle.

Turning now specifically to the implementation of FIGS. 1A and 1B, in this case, body 10 includes two parallel cuts 24, 26 on opposite sides of region 16 which define edges of the plug configuration, corresponding also to a direction of insertion of the device. Cuts 24 and 26 preferably extend between about 50% and 90% of the length (longer dimension) of body 10. Electronic circuitry 12 is typically confined to the space between the cut lines. In this embodiment, preformed fold line 18 extends between, and substantially perpendicular to, cuts 24 and 26, thereby defining a folded back second region 28 which provides the resilient force to press contacts 14 against the contacts of a USB socket.

The resulting plug configuration is best seen in FIG. 1B in which regions 16 and 28 on either side of fold line 18 form a resilient "V"-shape plug configuration, as viewed from the side. In the implementation shown here, second region 28 is sufficiently long that its end remains outside the receptacle when engaged, thereby ensuring that the device is easily removed from the receptacle after use. In certain alternative embodiments, engagement of the plug configuration within the socket may be enhanced by using a shorter second region 28 the entirety of which lies within the USB receptacle on insertion.

Optionally, additional peripheral surfaces of first region 16 and/or surfaces of second region 28 can be provided with conductive contact surfaces deployed to contact the shielding of the USB receptacle and provide electrical grounding of the device.

The plug configuration is shown here inserted into a USB receptacle 100 of a relatively thin host 102, such as a notebook computer, PDA or cellular telephone. Since the host body is relatively thin, the side flaps 30, 32 of body 10 which do not take an active part in engagement with the receptacle are preferably flexed upwards to lie on the upper corner of the host device, thereby also providing some additional resilient bias of the contacts 14 against the contacts of the receptacle.

It will be noted that the card device illustrated here may be used for a wide range of possible applications, and may include a range of additional features as required for those applications. By way of one non-limiting example, the card device illustrated here is an employee identity badge including various printed information such as an identity picture 70, a company emblem 72, a serial number 74 and/or the name and other details of the authorized card holder 76. Optionally, instructions for use 78 may also be printed on the front or rear surface of the device. Additionally, or alternatively, the card device may include a magnetic strip, an RF transponder chip or any other internal or external feature known for incorporation into a thin card-like device.

Other possible uses of the card devices of the present invention include, but are not limited to: ordinary business cards carrying electronic data; identity cards of all types; credit cards; smart cards; and other memory cards.

Figure 2A:
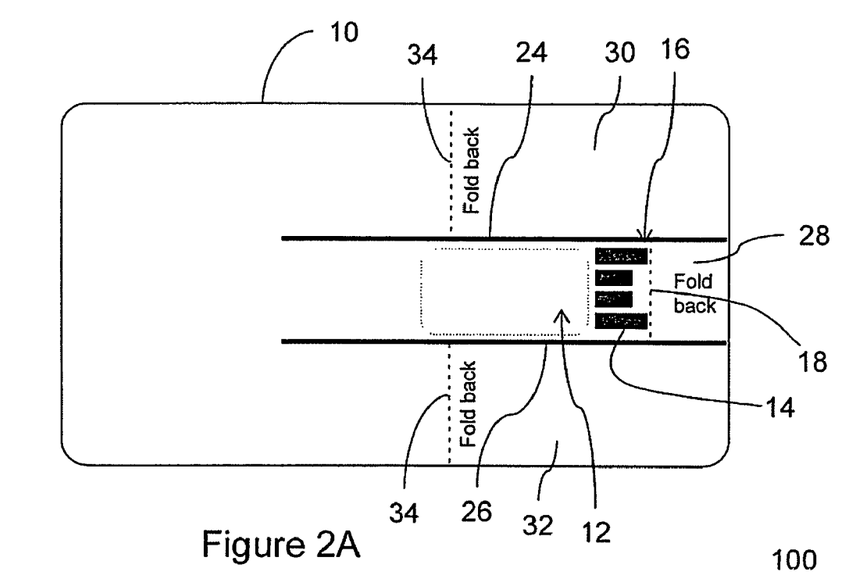
FIG. 2A is a front view of a first variant of the card device of FIG. 1A, constructed and operative according to the teachings of the present invention.
Figure 2B:
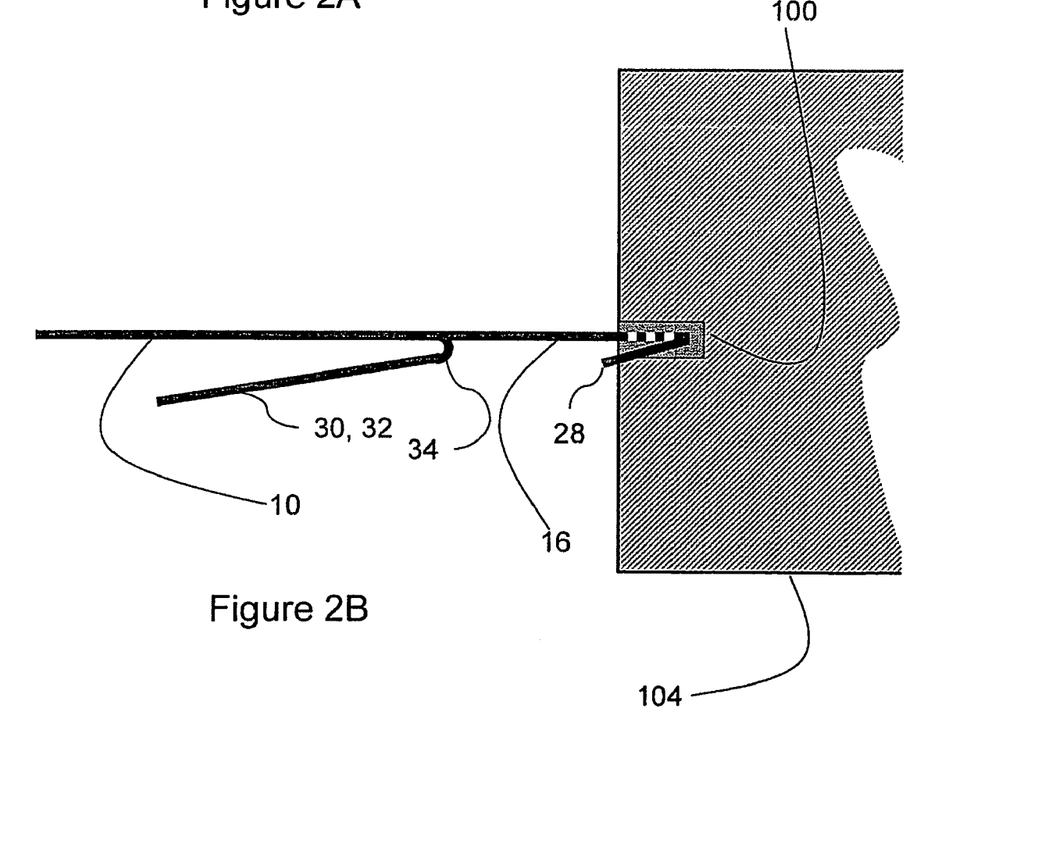
FIG. 2B is a side view of the card device of FIG. 2A connected to a USB receptacle.

FIGS. 2A and 2B show a variant of the embodiment of FIGS. 1A and 1B suitable for use with a host such as a desktop computer 104 where the USB receptacle 100 is typically disposed in a relatively large surface far from the edge of the host. In order to prevent side flaps 30 and 32 from interfering with engagement of the device in the USB receptacle, each flap is preferably provided with an additional preformed fold line 34 to allow folding of at least part of each flap away from the area of the plug configuration. The folded configuration is shown in FIG. 2B. In all other respects, the embodiment of FIGS. 2A and 2B is analogous to that of FIGS. 1A and 1B. Additional printed information shown in FIG. 1A has been omitted for clarity of presentation.

Figure 3:
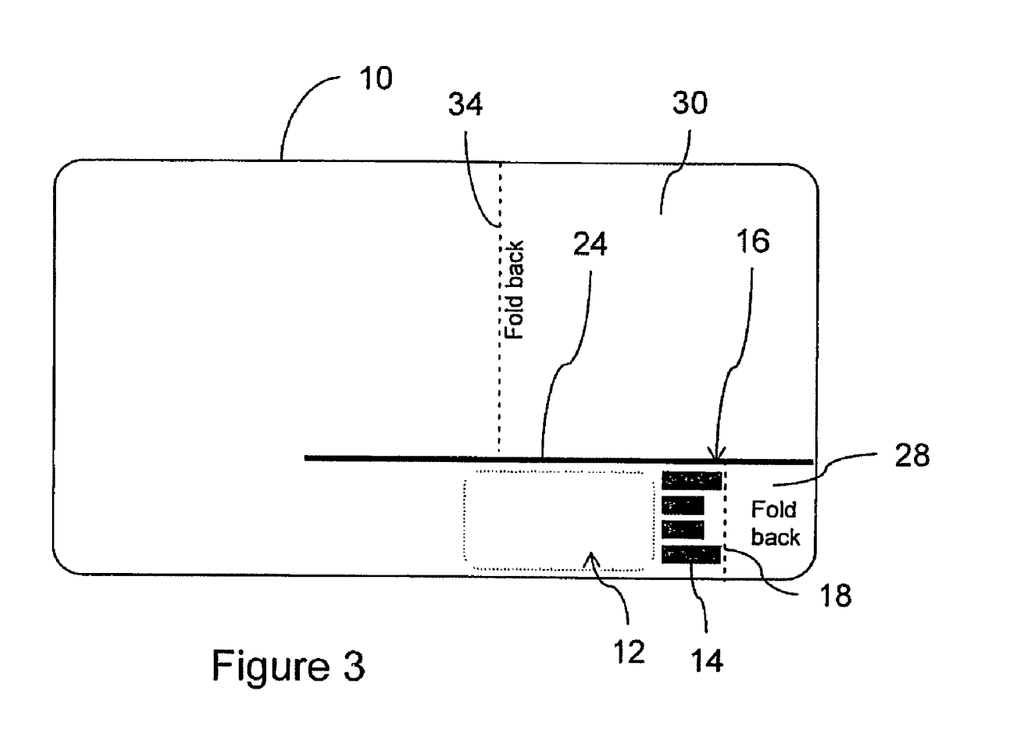
FIG. 3 is a front view of a second variant of the card device of FIG. 1A, constructed and operative according to the teachings of the present invention.

FIG. 3 shows a further variant in which a single cut 24 is used in conjunction with part of the peripheral edge of body 10, and parallel thereto, to define the edges of the plug configuration. In this case, flap 30 is enlarged and there is no second flap. In use, the side view of this embodiment is exactly as shown in FIG. 2B. The end of the strip making up the plug configuration may either be formed by a second edge of body 10 as shown, or by an additional cut perpendicular to cut 24 (not shown). In other respects, the structure and function of this embodiment is similar to that of the embodiment of FIGS. 1A and 1B.

In the embodiments of FIGS. 1A-3, the strip of body 10 making up the plug configuration extends to part of the external periphery of the body. While this is acceptable for many applications, it may in some cases be preferably to ensure that the outer periphery of body 10 is a continuous unbroken edge. This may be particularly advantageous where the device is to be inserted into a slot or into a flat pocket in a credit card wallet or the like, since any cut extending to the edge of the card is likely to catch on the edges of the pocket during insertion. Positioning of the connector away from the peripheral edge of the device also provides greater protection for the connector against mechanical damage and renders the entire card less susceptible to damage. Examples of two such embodiments are now illustrated in FIGS. 4A-5B.

Figure 4A:
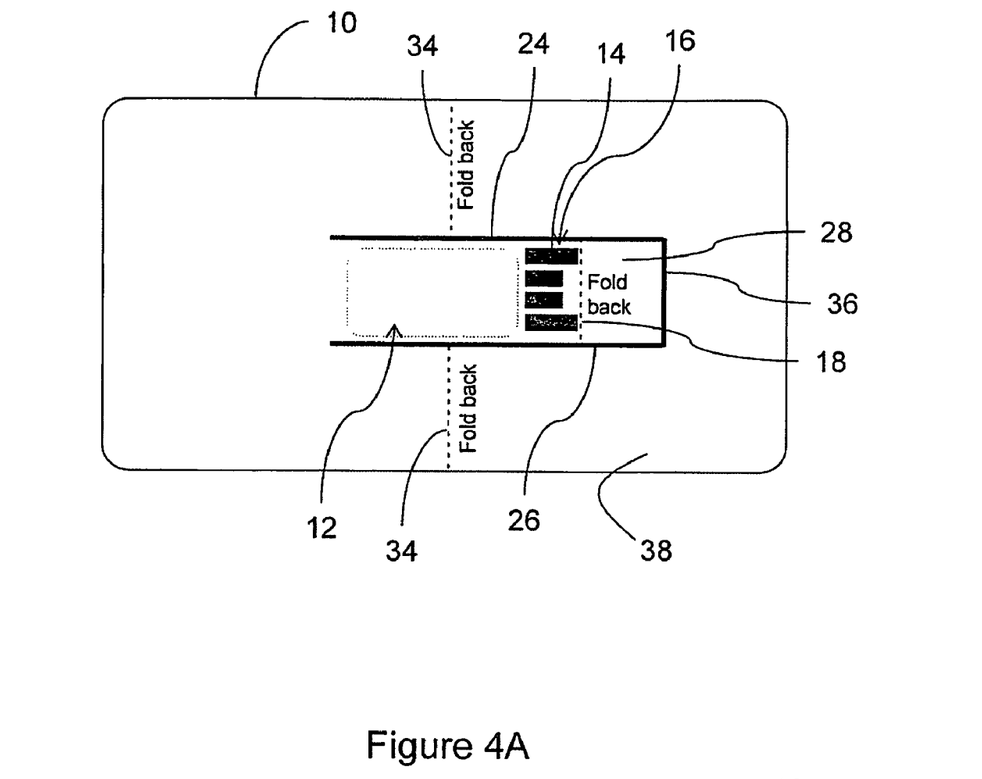
FIG. 4A is a front view of a second embodiment of a card device, constructed and operative according to the teachings of the present invention, for connection to a USB receptacle.
Figure 4B:
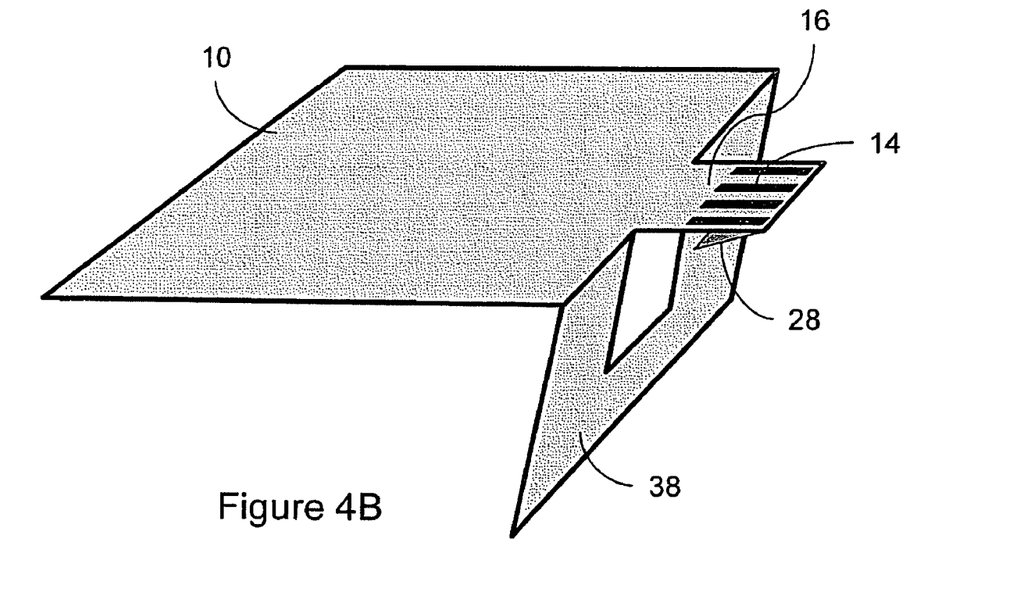
FIG. 4B is a schematic isometric view of the card device of FIG. 4A configured ready for connection to a USB receptacle.

Turning now to FIGS. 4A and 4B, these show a further embodiment of the present invention where parallel cuts 24 and 26 do not intersect a periphery of the substantially rectangular body. Instead, a third cut 36, substantially perpendicular to cuts 24 and 26, connects between the ends of the cuts so that, together, they define a plug-forming region of the body inset from a periphery of the substantially rectangular body. In this case, second region 28 is defined by the space between fold line 18 and cut 36. Fold lines 34 here serve to fold down the entire "U"-shaped region 38 of card 10 surrounding the plug-forming strip, leaving the strip itself to function in a manner fully analogous to that of FIGS. 2A and 2B. In all other respects, the embodiment of FIGS. 4A and 4B is similar in structure and function to that of the previous embodiments.

Figure 5A:
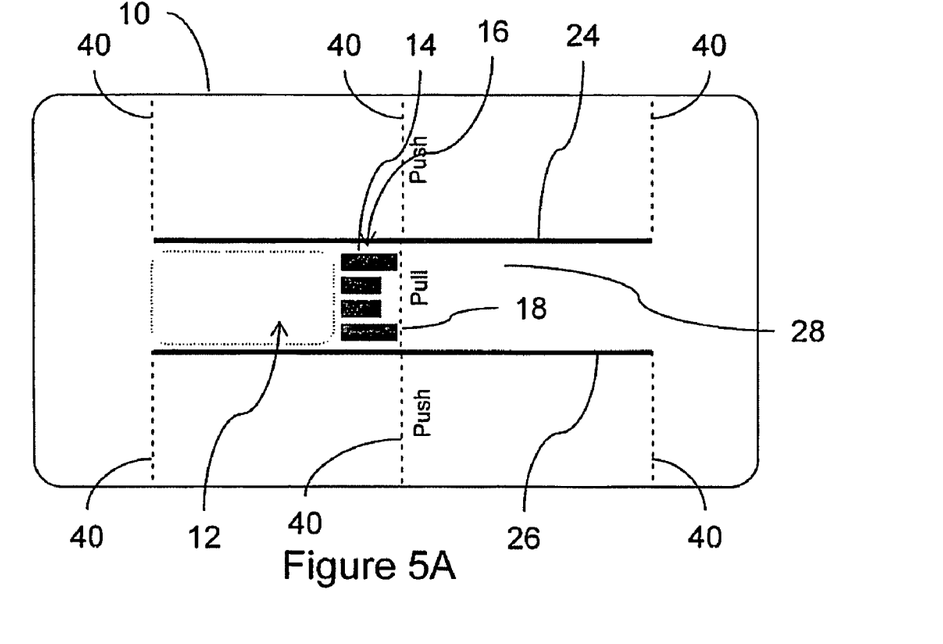
FIG. 5A is a front view of a third embodiment of a card device, constructed and operative according to the teachings of the present invention, for connection to a USB receptacle.
Figure 5B:
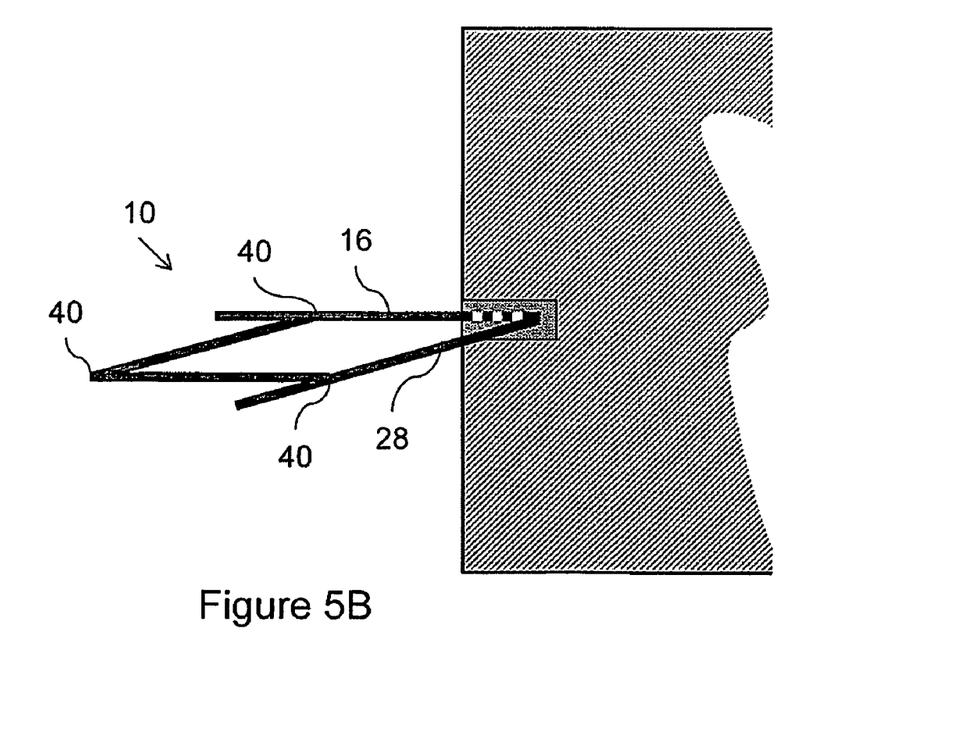
FIG. 5B is a side view of the card device of FIG. 5A connected to a USB receptacle.
Figure 6A:
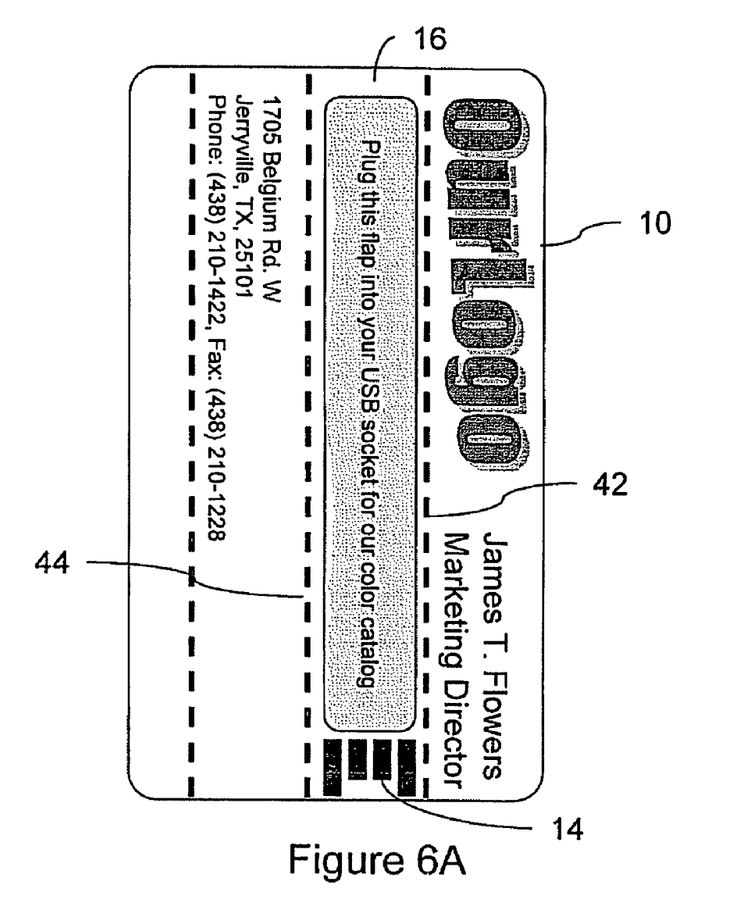
FIG. 6A is a front view of a fourth embodiment of a card device, constructed and operative according to the teachings of the present invention, for connection to a USB receptacle.
Figure 6B:
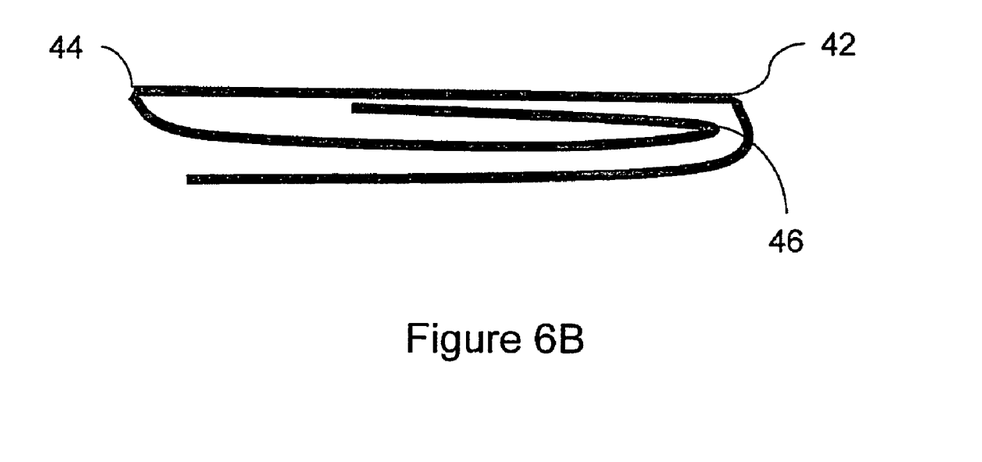
FIG. 6B is a schematic enlarged end view of the card device of FIG. 6A configured ready for connection to a USB receptacle.

Turning now to FIGS. 5A and 5B, these show another embodiment of the present invention where parallel cuts 24 and 26 do not intersect a periphery of the substantially rectangular body. In this case, the central strip between the cuts and the side strips outside the cuts fold in opposite directions, the center upwards and the sides rearwards, to achieve a scissors-like folded structure as shown in FIG. 5B. To achieve this formation, in addition to fold line 18, body 10 is formed with an additional three fold lines 40 along each outer edge. Alternatively, a similar effect may be obtained using only the central fold line of each outer edge and adding a fold line at each end of the central strip. In all other respects, the structure and operation of the embodiment of FIGS. 5A and 5B are similar to those of the embodiments previously described.

Parenthetically, regarding the cut lines mentioned in any embodiment of the present invention, it should be noted that these may optionally be implemented initially with small break-away tabs interconnecting the two sides of the cut so as to ensure that the parts on opposite sides of the cuts do not separate or get bent out of plane during manufacture, shipping or distribution of the device. These tabs would then typically be broken by the user immediately prior to the first use of the card for connection to a USB receptacle. Such tabs may also serve as a useful tamperproof indication for certain applications of the present invention.

Turning now to FIGS. 6A-7B, in contrast to the previous embodiments where at least one preformed fold line extends perpendicular to the direction of insertion, these embodiments illustrate examples where at least one preformed fold line extends substantially parallel to the direction of insertion. Thus, referring first to FIGS. 6A and 6B, this shows an implementation where body 10 features two preformed fold lines 42 and 44 which define the edges of the plug configuration when folded. In the example shown here, body 10 is provided with one or more additional fold line 46, each preferably substantially parallel to fold lines 42 and 44 to allow the entirety of body 10 to fold into a plug configuration, preferably without use of any cut lines. This folded plug configuration is shown end-on and enlarged in FIG. 6B. It will be appreciated that this embodiment is particularly suited to thin implementations, and most preferably where the thickness of body 10 is no more than about 0.2 mm.

Figure 7A:
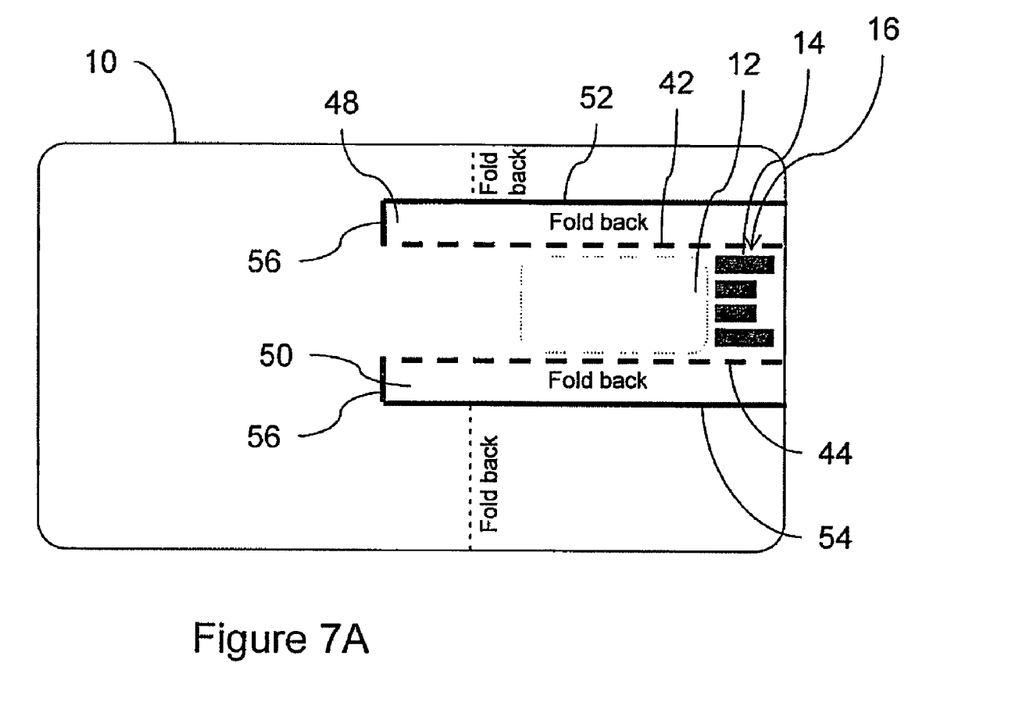
FIG. 7A is a front view of a fifth embodiment of a card device, constructed and operative according to the teachings of the present invention, for connection to a USB receptacle.
Figure 7B:
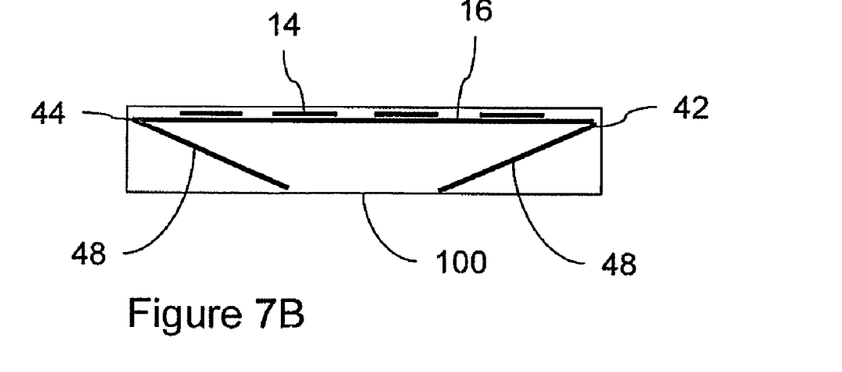
FIG. 7B is a schematic enlarged end view of a plug configuration from the card device of FIG. 7A inserted into a USB receptacle.
Figure 8A:
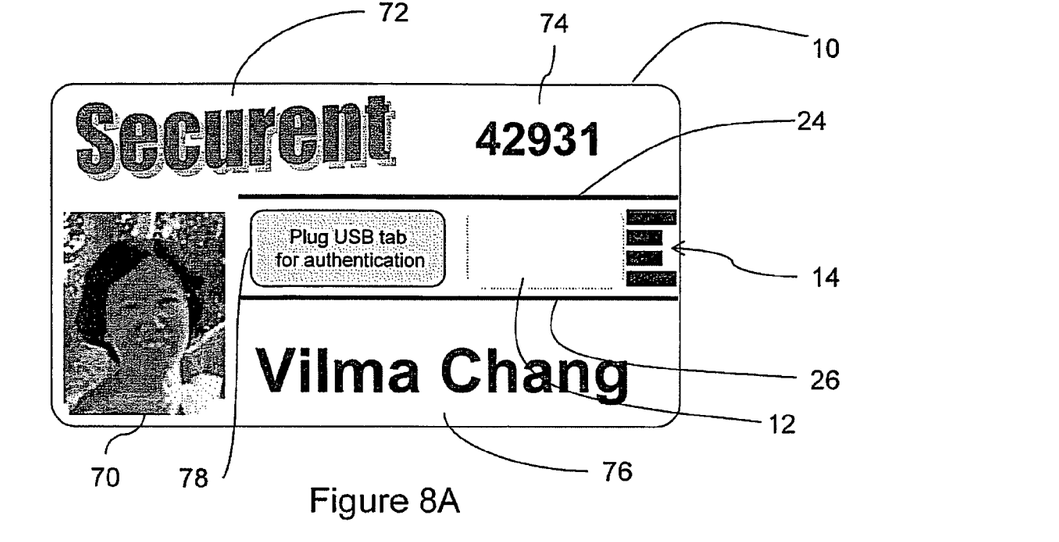
FIG. 8A is a front view of a sixth embodiment of a card device, constructed and operative according to the teachings of the present invention, for connection to a USB receptacle.
Figure 8B:
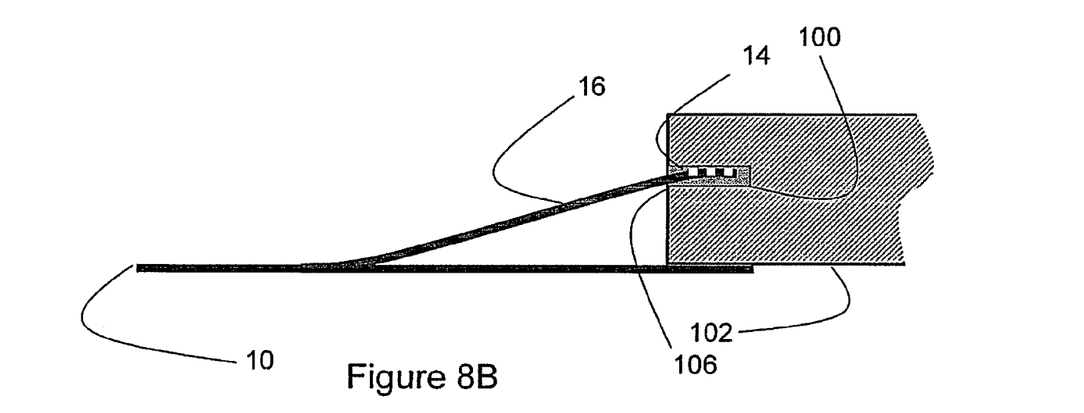
FIG. 8B is a schematic side view of the card device of FIG. 8A connected to a USB receptacle.
Figure 8C:
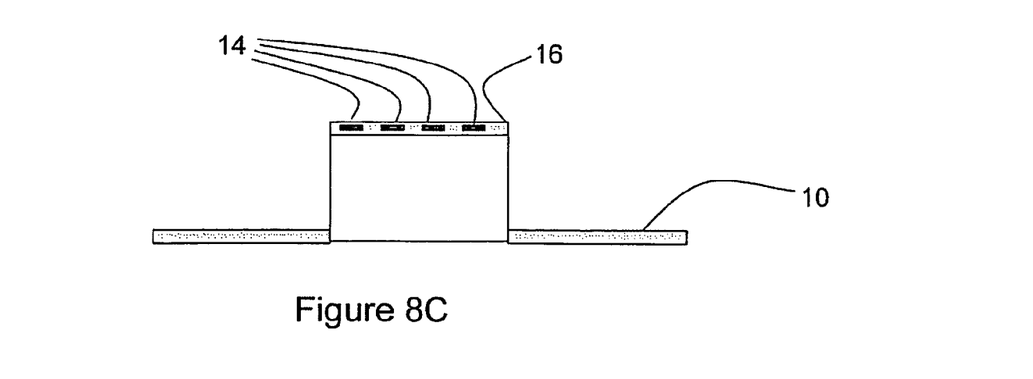
FIG. 8C is an end view of the card device of FIG. 8A ready for connection to a USB receptacle.

FIGS. 7A and 7B illustrate a further embodiment employing fold lines 42 and 44 to define the edges of the plug configuration. In this case, each fold line has a corresponding second region 48 and 50, respectively, which folds under first region 16 to form a spring element on each side of the plug configuration. A pair of cut lines 52 and 54 delineate the outer edges of regions 48 and 50. Small secondary cuts 56 are also typically required in order to free regions 48 and 50 to fold. FIG. 7B shows an enlarged end view of the plug configuration inserted into a USB receptacle 100. The folded-back side flaps have been omitted from FIG. 7B for simplicity of presentation. As before, the plug configuration may be formed at the periphery of the card device or centrally within the card, and may optionally employ an edge of the card instead of one of the cut lines.

Turning now to FIGS. 8A-8C, although the embodiments of the present invention described thus far all include a fold in body 10, it should be noted that it is possible to employ distributed flexing of the body over a large region to achieve similar flexible biasing of contacts 14 against the contacts of a USB receptacle. This is particularly true where the flexing occurs largely outside the receptacle. An example of such an embodiment is shown here in FIGS. 8A-8C.

Specifically, FIG. 8A shows a card device in which body 10 has two parallel cut lines 24 and 26 defining a plug-forming strip in which are located electronics 12 and contacts 14. In this case, no localized fold lines are provided. Instead, insertion of the plug-forming strip into an USB receptacle is achieved simply by flexing the central strip upwards into a different plane from the adjacent flaps, as illustrated in FIGS. 8B and 8C. The resilience of the material of the card device here serves as an external spring which tends to close the parts of the card device back to their coplanar starting position. The resulting downward force on the lower outer edge 106 of the receptacle 100 as shown tends to generate a leverage on the tip portion of the inserted strip, thereby pressing contacts 14 against the corresponding receptacle contacts.

It will be appreciated that the various technologies needed for implementing the aforementioned embodiments of the present invention and variants thereof are well known in the art. By way of non-limiting example, the production technologies typically include some or all of the following processes:

A. Embedding a flash memory and a memory controller in a plastic card. This process is known in the art and is available commercially as a service provided by Emosyn America Emosyn America, Sunnyvale, Calif. U.S.A.

B. Providing conductive leads on one side of the plastic card, in any of the configurations described in the drawings above. The process of embedding a USB connector on a plastic card is known in the art, and is available commercially as a service provided by I.B.D.A Ltd, Rishon Lezion, Israel.

C. Stamping the card to create the slots and the dents for enabling the bending and folding of the card as described in any of the drawings above.

D. Printing the graphical and textual information on the card, using a badge printer such as the DTC300 badge printer available from Fargo, and distributed by Industrial Covert Unlimited from Traverse City, Mich., USA.

The thickness of a typical plastic card, such as a credit card, used for the present invention is preferably less than half, and most preferably no more than about 33% of the nominal thickness required of a USB connector plate for reliable engagement with a USB receptacle.

It will be appreciated that the above descriptions are intended only to serve as examples, and that many other embodiments are possible within the scope of the present invention as defined in the appended claims.

What is claimed is:

1. A card device for connection to a USB receptacle, the card device comprising a substantially rectangular body formed from flexible material and including:
   (a) electronic circuitry;
   (b) a set of electrical contacts deployed on a surface of a first region of said body and electrically connected to said electronic circuitry; and
   (c) at least one preformed fold line passing adjacent to said first region and defining a line for folding a corresponding second region of said body relative to said first region of said body from a flat state to a folded state, wherein said set of electrical contacts and said at least one preformed fold line are configured such that, when said body is folded along said at least one preformed fold line, said first and second regions form a plug configuration sized for insertion into the USB receptacle with said electrical contacts positioned to contact electrical contacts of the USB receptacle, and such that a resilient bias of said second region to return to said flat state generates a contact force of said electrical contacts against contacts of the USB receptacle.

2. The card device of claim 1, wherein said substantially rectangular body further includes at least one cut passing adjacent to said first region and defining an edge of said plug configuration.

3. The card device of claim 2, wherein said preformed fold line extends substantially perpendicular to said cut.

4. The card device of claim 2, wherein said substantially rectangular body includes two parallel cuts on opposite sides of said first region and defining edges of said plug configuration.

5. The card device of claim 4, wherein said preformed fold line extends between, and substantially perpendicular to, said two parallel cuts.

6. The card device of claim 4, wherein said parallel cuts do not intersect a periphery of said substantially rectangular body.

7. The card device of claim 4, wherein said substantially rectangular body further includes a third cut such that said parallel cuts and said third cut together define a plug-forming region of said body inset from a periphery of said substantially rectangular body.

8. The card device of claim 1, wherein said plug configuration defines a direction of insertion, and wherein said at least one preformed fold line extends substantially perpendicular to said direction of insertion.

9. The card device of claim 1, wherein said plug configuration defines a direction of insertion, and wherein said at least one preformed fold line extends substantially parallel to said direction of insertion.

10. The card device of claim 9, wherein said at least one preformed fold line includes at least two preformed fold lines, said preformed fold lines defining edges of said plug configuration.

11. The card device of claim 10, wherein an entirety of said substantially rectangular body is folded along at least three substantially parallel fold lines to form said plug configuration.

12. The card device of claim 1, wherein said substantially rectangular body has a thickness less than half a minimum effective thickness required for mechanical engagement with the USB receptacle.

13. A card device for connection to a USB receptacle, the card device comprising a substantially rectangular body formed from flexible material and including:
   (a) electronic circuitry;
   (b) a set of electrical contacts deployed on a surface of a first region of said body and electrically connected to said electronic circuitry; and
   (c) at least one flexion region, wherein said set of electrical contacts and said flexion region are configured such that, when said body is flexed at said at least one flexion region, said first region forms at least part of a plug configuration sized for insertion into the USB receptacle with said electrical contacts positioned to contact electrical contacts of the USB receptacle, and such that a resilient bias of said flexion region to return to a flat state generates a contact force of said electrical contacts against contacts of the USB receptacle.

* * * * *